United States Patent
DeRosa

(10) Patent No.: US 7,324,296 B1
(45) Date of Patent: Jan. 29, 2008

(54) METHODS AND APPARATUS FOR CONTROLLING TRANSDUCER SEEK TIME IN A DATA STORAGE DEVICE BASED ON THERMAL INPUTS

(75) Inventor: Jeffrey V. DeRosa, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/384,655

(22) Filed: Mar. 20, 2006

Related U.S. Application Data

(60) Provisional application No. 60/723,169, filed on Oct. 3, 2005.

(51) Int. Cl.
*G11B 5/02* (2006.01)
(52) U.S. Cl. ...................................................... 360/59
(58) Field of Classification Search .................. 360/59, 360/75, 78.08, 77.04, 77.08, 69, 78.04, 60; 702/179
See application file for complete search history.

(56) References Cited

U.S. PATENT DOCUMENTS

| | | | |
|---|---|---|---|
| 6,342,985 B1 * | 1/2002 | Clare et al. ................... 360/75 |
| 6,785,632 B1 * | 8/2004 | Goker ......................... 702/179 |
| 6,934,107 B2 * | 8/2005 | Escobar et al. ............... 360/69 |
| 6,937,427 B2 * | 8/2005 | Tan et al. ................. 360/78.04 |
| 6,970,315 B2 * | 11/2005 | Tanimoto ...................... 360/60 |
| 7,031,091 B2 * | 4/2006 | Ichihara et al. ............... 360/75 |
| 7,136,247 B2 * | 11/2006 | Escobar et al. ............... 360/69 |
| 2004/0264036 A1 | 12/2004 | Ding et al. |

\* cited by examiner

*Primary Examiner*—Fred F. Tzeng
(74) *Attorney, Agent, or Firm*—Myers Bigel Sibley & Sajovec, P.A.

(57) ABSTRACT

Methods of controlling seeking of a transducer that is adjacent to a rotatable disk in a disk drive include determining a seek time associated with moving the transducer from an initial track on the rotatable disk to a target track on the rotatable disk, detecting a temperature associated with the disk drive, and determining if the detected temperature exceeds a temperature threshold. The methods may further include increasing the seek time to provide an increased seek time in response to the detected temperature exceeding the temperature threshold, generating a current command based on the increased seek time, and seeking the transducer from the initial track to the target track on the disk based on the current command. An apparatus configured to control the seeking of a transducer is also disclosed.

34 Claims, 9 Drawing Sheets

METHODS AND APPARATUS FOR CONTROLLING TRANSDUCER SEEK TIME IN A DATA STORAGE DEVICE BASED ON THERMAL INPUTS

RELATED APPLICATION

This application claims the benefit of and priority to U.S. Provisional Patent Application No. 60/723,169 titled "THERMAL GOVERNOR ALGORITHM", filed Oct. 3, 2005, the disclosure of which is hereby incorporated herein by reference as if set forth in its entirety.

FIELD OF THE INVENTION

The present invention generally relates to digital data storage devices and, more particularly, to methods, apparatus, and computer program products for seeking a transducer between tracks on a disk in a disk drive.

BACKGROUND OF THE INVENTION

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and a host computer. The transducers can be radially positioned over the disks by a rotary actuator and a closed loop, digital servo system, and are can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a destination track on the corresponding disk surface. The servo system applies current to an actuator coil to first accelerate and then decelerate the transducer toward the destination track.

During the seek, the servo system may sequentially measure the actual velocity of the transducer and adjust the current in relation to velocity error (i.e., the difference between the actual velocity and a target velocity). As the transducer approaches the destination track, the servo system initiates a settle mode to bring the transducer to rest over the destination track within a selected settle threshold, such as a percentage of the track width from track center. Thereafter, the servo system enters the track following mode wherein the transducer is nominally maintained over the center of the destination track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, disk drives can attempt to obtain minimum average seek times. However, the forces that can be exerted on the actuator to obtain minimum average seek times can cause vibration of the actuator and the disk drive, and can result in a decrease in the seek performance and undesirable acoustical noise.

In addition to the vibration that may result from forces that may be exerted on the actuator to obtain minimum seek times, the electric current that may be required to be applied to the actuator coil motor of a disk drive in order to obtain minimum seek times may result in undesirable heating of the disk drive assembly and/or elements thereof. Heating of the disk drive assembly may have a number of deleterious effects on the operation of a disk drive. For example, since various components of a disk drive may have different coefficients of thermal expansion, heating of the disk drive, or components thereof, may result in mechanical instability within the disk drive, which may result in errors in drive operation. Further, excessive heat may damage sensitive components of a disk drive, such as the platter surfaces, the printed circuit board assembly (PCBA) and associated components, the read/write transducer, the pre-amplifier circuit and/or other components.

Conventional disk drives include circuitry configured to shut the disk drive down if a temperature associated with the disk drive exceeds a predetermined threshold. A temperature associated with the disk drive may include, for example, the temperature within the case of the disk drive, the ambient temperature of the environment in which the disk drive is operated, a temperature sensed at the PCBA, and/or the temperature of a component of the disk drive. When the temperature of the disk drive exceeds the threshold temperature, the result may be an abrupt shutdown of the disk drive, which may result in loss and/or corruption of data.

One approach to thermal management in disk drives is disclosed in U.S. Patent Application Publication No. 2004/0264036 to Ding et al. Ding et al. disclose a method of determining a seek profile compensation value that can be used to compensate a pre-defined seek profile for temperature. Seek profile compensation values are determined for a plurality of device operating temperatures and/or for a plurality of device operating temperatures and seek lengths, and are used during disk drive operation to compensate seek profiles based on the device operating temperature and/or seek length at the time a seek is executed.

SUMMARY OF THE INVENTION

Methods of controlling seeking of a transducer that is adjacent to a rotatable disk in a disk drive according to some embodiments of the invention include detecting a temperature associated with the disk drive, determining a seek time associated with moving the transducer from an initial track on the rotatable disk to a target track on the rotatable disk, wherein the seek time is varied in response to the detected temperature. A current command is generated based on the increased seek time, and the transducer is moved from the initial track to the target track on the disk based on the current command. The methods may further include determining if the detected temperature exceeds a temperature threshold and increasing the seek time to provide an increased seek time in response to the detected temperature exceeding the temperature threshold.

Generating the current command may include selecting the current command based on the seek time and scaling the current command based on the detected temperature.

Increasing the seek time may include increasing the seek time by a seek delay. The seek delay may be based on an amount by which the detected temperature exceeds the temperature threshold, and/or the seek delay may be a constant value.

The methods may further include determining if the detected temperature is below the threshold by a predetermined amount, and responsive to the detected temperature being below the threshold by a predetermined amount, decreasing the seek delay.

Increasing the seek time may include increasing the seek time to at least a minimum seek time.

The methods may further include determining if the detected temperature is below the threshold by a predetermined amount, and responsive to the detected temperature being below the threshold by a predetermined amount, decreasing the minimum seek time.

The methods may further include receiving a plurality of I/O requests including a first I/O request and a second I/O request, queuing the first I/O request and the second I/O request, determining a seek time for the second I/O request, and increasing the seek time of the second I/O request. The methods may further include determining a rotational latency time for the first I/O request based on the increased seek time of the first I/O request, and determining a rotational latency time for the second I/O request based on the increased seek time of the second I/O request. The first I/O request is executed before the second I/O request in response to the sum of the delayed seek time and the expected rotational latency of the second I/O request exceeding the sum of the delayed seek time and the expected rotational latency of the first I/O request.

Determining a seek time may include determining an expected seek time associated with moving the transducer from the initial track on the rotatable disk to the target track on the rotatable disk and an expected rotational latency time associated with rotating the rotatable disk to a target sector on the target track, increasing the seek time may include increasing the expected rotational latency time to provide an increased rotational latency time, and generating a current command may include selecting a current command based on the seek time and scaling the current command based on the increased rotational latency time.

Increasing the expected rotational latency time may include increasing the expected rotational latency time by a time equal to an integer number of rotational periods of the rotatable disk, and/or increasing the expected rotational latency time may include increasing the expected rotational latency time by a time equal to a fractional number of rotational periods of the rotatable disk.

The methods may further include determining if a sum of the expected seek time and the expected rotational latency time exceeds a minimum seek time, scaling the current command based on the expected seek time and the expected rotational latency time to generate the scaled current command in response to the sum of the expected seek time and the expected rotational latency time exceeding a minimum seek time, and seeking the transducer from the initial track to the target track on the disk based on the scaled current command.

The methods may further include reordering an I/O request queue to permit an I/O request for which a sum of an expected seek time and an expected rotational latency time exceeds the minimum seek time to be executed ahead of an I/O request for which a sum of an expected seek time and an expected rotational latency time does not exceed the minimum seek time.

Determining an expected seek time and an expected rotational latency time may include determining the expected seek time based on the initial track and the target track, and determining the expected rotational latency time based on an expected location of the transducer after seeking to the target track and based on the location of the addressed data block.

The methods may further include determining a maximum current based on the initial track and the target track, scaling the current command may include scaling the maximum current to generate a scaled maximum current based on the increased expected rotational latency time and the expected seek time, and constraining the current command to no more than the scaled maximum current.

Determining a maximum current may include selecting the maximum current from among a plurality of maximum currents that have been predefined based on the initial track and the target track.

Scaling the maximum current may include determining a scaling ratio based a ratio of the expected rotational latency time to the expected seek time, determining a scale factor based on the following equation:

$$\text{scale factor} = \frac{\text{tuning gain}}{\text{scaling ratio} + \text{tuning gain}}$$

wherein the tuning gain is a predetermined number less than 1, and combining the scale factor and the maximum current command to generate the scaled maximum current.

Methods of controlling seeking of a transducer that is adjacent to a rotatable disk in a disk drive according to further embodiments of the invention include detecting a temperature associated with the disk drive, determining if the detected temperature exceeds a temperature threshold, and responsive to the detected temperature exceeding the temperature threshold, increasing a minimum seek time and/or a seek delay associated with moving the transducer from an initial track on the rotatable disk to a target track on the rotatable disk.

The temperature threshold may include an upper temperature threshold, and the methods may further include determining if the detected temperature is below a lower temperature threshold that is lower than the upper temperature threshold, and responsive to the detected temperature being lower than the lower temperature threshold, decreasing the minimum seek time and/or the seek delay.

The methods may further include determining a seek time for an I/O request, increasing the seek time of the I/O request when the seek time of the I/O request exceeds the minimum seek time, calculating a current command based on the increased seek time, and seeking the transducer from the initial track to the target track on the disk based on the current command.

Increasing the seek time may include increasing the seek time by a time equal to one rotational period of the rotatable disk.

The I/O request may include a first I/O request that is queued ahead of a second I/O request, and the methods may further include determining an expected seek time for the second I/O request, and executing the second I/O request before the first I/O request in response to the expected seek time for the second I/O request exceeding the minimum seek time.

The methods may further include determining a seek time for a first queued I/O request, determining a seek time for a second queued I/O request, increasing the seek times of the first and second queued I/O requests by the seek delay to provide increased seek times for the first and second queued I/O requests, determining a rotational latency time for the first I/O request based on the increased seek time of the first I/O request, determining a rotational latency time for the second I/O request based on the increased seek time of the second I/O request, and executing the first I/O request before the second I/O request in response to the sum of the delayed seek time and the expected rotational latency of the second I/O request exceeding the sum of the delayed seek time and the expected rotational latency for the first I/O request.

Methods of controlling seeking of a transducer that is adjacent to a rotatable disk in a disk drive according to further embodiments of the invention include determining an expected seek time associated with moving the transducer from an initial track on the rotatable disk to a target track on the rotatable disk and an expected rotational latency time associated with rotating the rotatable disk to a target sector on the target track, detecting a temperature associated with the disk drive, determining if the detected temperature exceeds a temperature threshold, and, responsive to the detected temperature exceeding the temperature threshold, increasing the expected rotational latency time to provide an increased rotational latency time. A current command is selected based on the expected seek time, and the current command is scaled based on the expected seek time and the increased rotational latency time.

Some embodiments of the invention provide an apparatus for controlling seeking of a transducer that is adjacent to a rotatable disk in a disk drive, the apparatus including a servo controller configured to detect a temperature associated with the disk drive and to determine a seek time associated with moving the transducer from an initial track on the rotatable disk to a target track on the rotatable disk based on the detected temperature. The servo controller may be further configured to generate a current command based on the increased seek time, and to seek the transducer from the initial track to the target track on the disk based on the current command.

The servo controller may be further configured to determine if the detected temperature exceeds a temperature threshold and to increase the seek time in response to the detected temperature exceeding the temperature threshold.

The servo controller may be further configured to generate the current command by selecting the current command based on the seek time and scaling the current command based on the increased seek time.

The servo controller may be further configured to increase the seek time by a seek delay. The seek delay may be based on an amount by which the detected temperature exceeds the temperature threshold, and/or the seek delay may be a constant value.

The servo controller may be further configured to determine if the detected temperature is below the threshold by a predetermined amount, and responsive to the detected temperature being below the threshold by a predetermined amount, to decrease the seek delay.

The servo controller may be further configured to increase the seek time to at least a minimum seek time.

The servo controller may be further configured to determine if the detected temperature is below the threshold by a predetermined amount, and responsive to the detected temperature being below the threshold by a predetermined amount, to decrease the minimum seek time.

The servo controller may be further configured to receive a plurality of I/O requests including a first I/O request and a second I/O request, to queue the first I/O request and the second I/O request, to determine seek times for the first and second I/O requests, and to increase the seek times of the first and second I/O requests in response to the detected temperature. The servo may be further configured to determine a rotational latency time for the first I/O request based on the increased seek time of the first I/O request and a rotational latency time for the second I/O request based on the increased seek time of the second I/O request. The servo may be further configured to execute the first I/O request before the second I/O request responsive to the sum of the delayed seek time and the expected rotational latency of the second I/O request exceeding the sum of the delayed seek time and the expected rotational latency of the first I/O request.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as apparatus, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
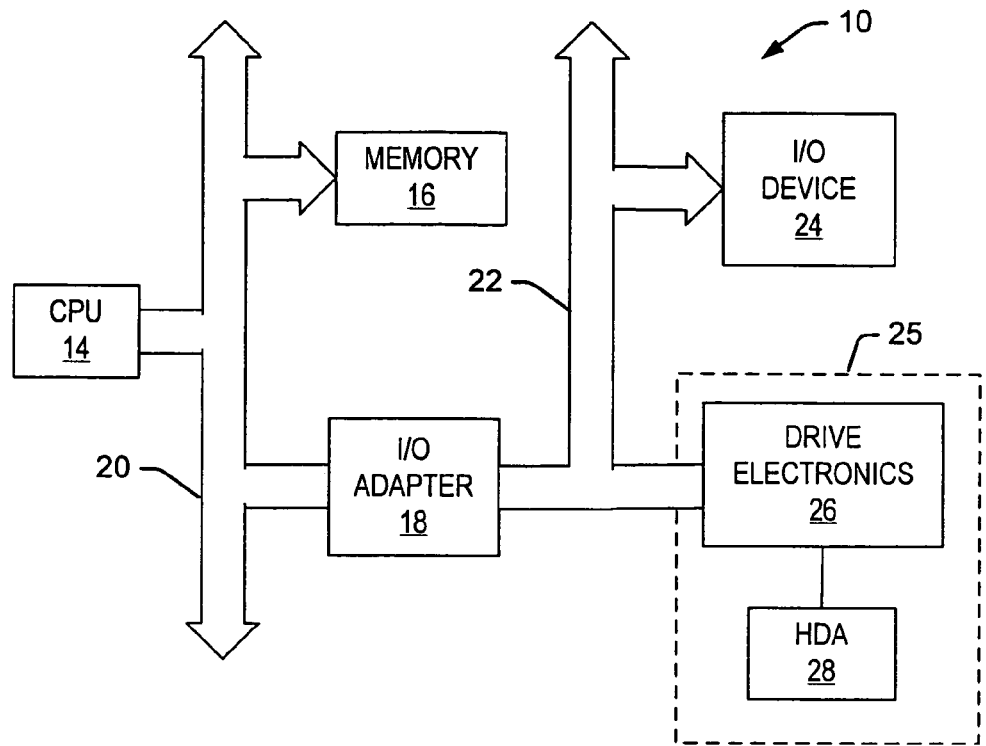
FIG. 1 is a block diagram of an exemplary computer system that includes a disk drive.

Referring to FIG. 1, an exemplary computer system 10 is shown that includes a central processing unit ("CPU") 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 ("HDA").

Figure 2:
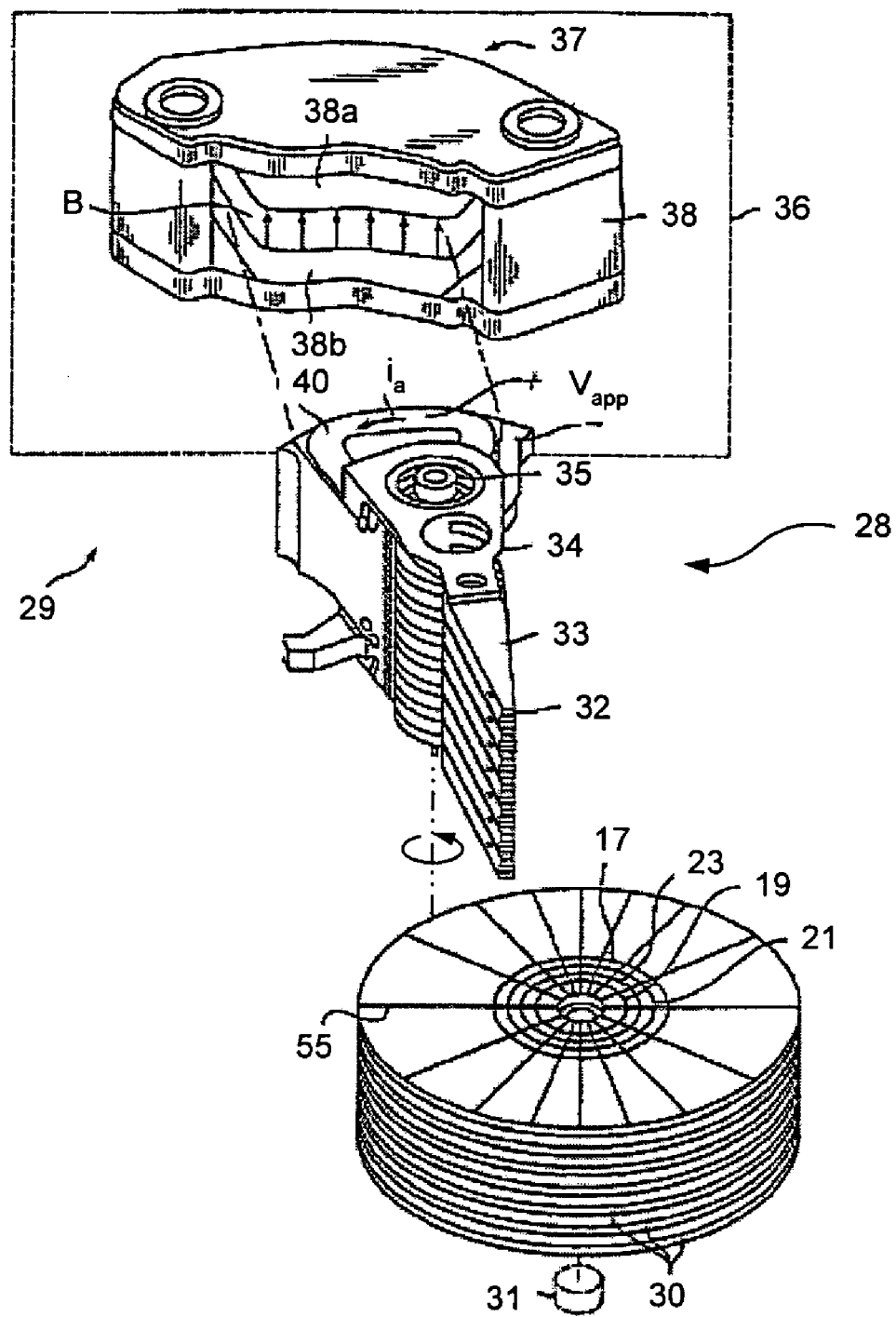
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. A motor 36 controls the radial movement of the actuator arms 34 in proportion to an input actuator current ia. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38a, 38b coupled together via a pair of sidewalls to form a flat toroidal shaped member 38. A wire coil 40 is disposed between the two plates 38a and 38b. The magnet 37 may generate a constant magnetic field B between the plates 38a and 38b. When the input actuator current ia is induced in the coil 40 disposed in the magnetic field B, a torque is produced on the actuator arms 34 resulting in radial motion of the arms 34 about pivot point 35. The polarity of the input actuator current ia determines the direction of radial motion of the actuator arms 34.

Figure 3:
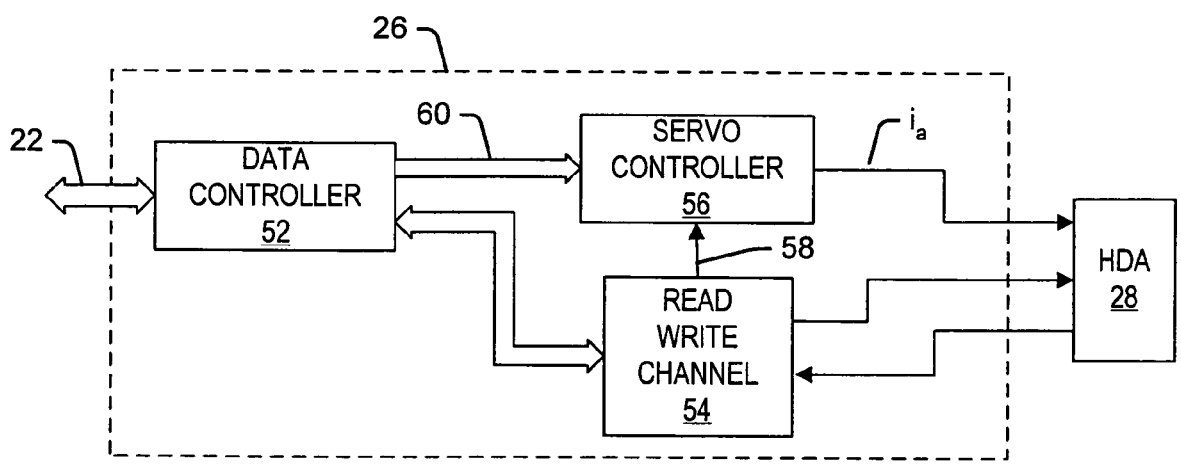
FIG. 3 is a block diagram of the drive electronics of the disk drive according to some embodiments of the present invention.

Referring to FIG. 3, the drive electronics 26 (FIG. 1) includes a data controller 52, a read/write channel 54, and a servo controller 56. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54. The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducer 32 in relation to that track and data block within the track. The transducer location information is induced into the transducer 32, converted from analog signals to digital data in the read/write channel 54, and transferred to the servo controller 56. The servo controller 56 can use the transducer location information for performing seek and tracking operations of the transducer 32 over the disk tracks 17.

The data controller 52 also provides data that identifies the target track location and the addressed data block on lines 60 to the servo controller 56. The time to perform a seek from between an initial track to a target track is typically known as "seek time". The servo controller 56 generates a current command that is converted into the input actuator current $i_a$, and provided to the actuator 29 to radially move the transducer 32 across the disk 30. The seek time is thereby dependent on the magnitude of the current command.

Once the transducer 32 has reached the target track 17, the time required to rotate the disk 30 to a desired sector to perform a particular data access can be referred to as "rotational latency time," or, more succinctly, "rotational latency." The rotational latency can be the time required to rotate from a current position to a desired position on the disk 30. Thus, the rotational latency may be as great as the time required for one revolution of the disk 30. The rotational latency is dependent on the angular velocity of the disk 30, which is usually expressed in revolutions per minute (RPM). Generally, the total time to access an addressed data block on the disk 30 is about equal to the sum of the seek time, the rotational latency, and the time required to read or write the data.

Figure 5:
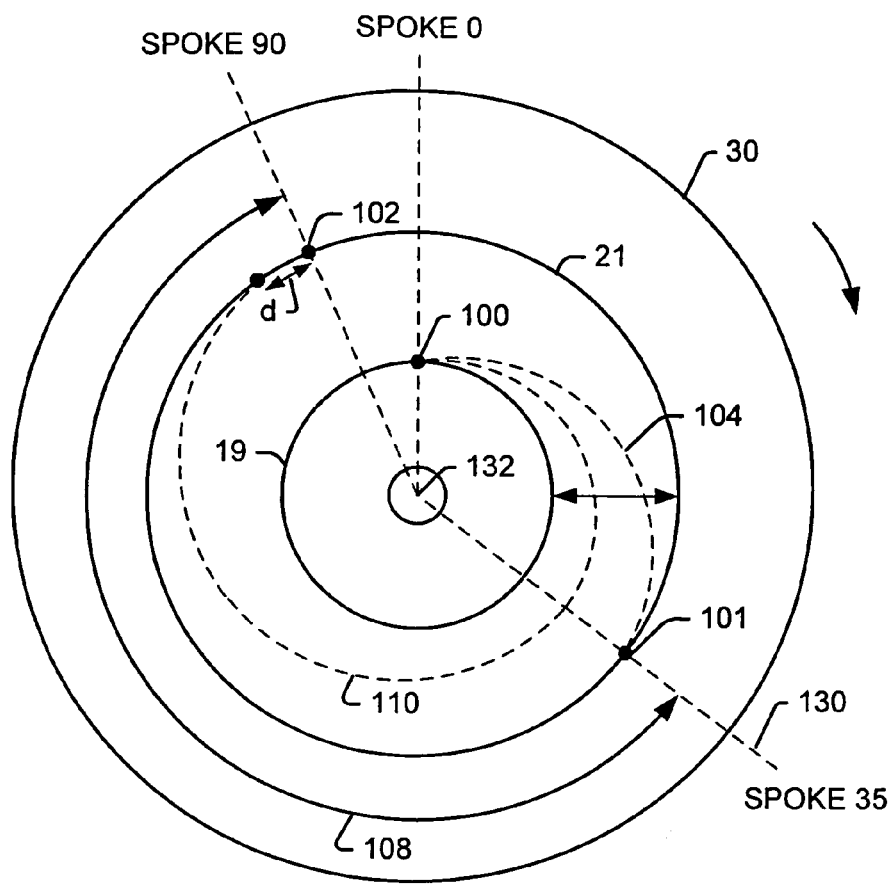
FIG. 5 is a diagram of a disk drive that illustrates a seek operation according to some embodiments of the present invention.

Referring now to FIG. 5, an exemplary one of the disks 30 is shown that illustrates a start location 100 of the transducer 32 (FIG. 2) on the initial track 19, and an addressed data block 102 on the target track 21 to which the CPU 14 has requested access. In one example seek operation, which may correspond to use of a maximum current command that corresponds to saturation of the motor 36, the servo controller 56 may move the transducer 32 along path 104 between the initial track 19 and the target track 21. Strong acceleration and deceleration of the actuator 29 can cause significant noise and vibration of the HDA 29 components, and may cause degraded seek performance and/or off-track writing of data. Accordingly, it may be advantageous to increase the seek time and allow a decrease in the acceleration and deceleration of the actuator 29.

In the exemplary seek operation, after seeking to the target track 21 along path 104, the disk 30 must continue to rotate an angular amount 108 (i.e. the rotational latency) before the transducer 32 reaches the addressed data block 102. According to various embodiments of the present invention, the servo controller 56 regulates the current command based on the location of the transducer 32 and based on a location of the addressed data block 102. For example, the servo controller 56 may regulate the current command so that the transducer 32 reaches the target track 21a predetermined time/distance d before the addressed data block 102 reaches the transducer 32, such as along path 110. The predetermined time/distance d may correspond to a typical time for the transducer to settle on the target track 21 following a seek operation.

The disk 30 may be logically divided into a number of evenly spaced wedges or spokes 130 extending radially away from a center point 132 of the disk 30. Since the disk 30 rotates at a constant rotational speed, the number of spokes per unit time passing under the transducer 32 is also constant. Thus, times associated with the disk drive, such as seek times, latency times, delay times, etc., may be measured in terms of the number of spokes 130 passing under the transducer 32 during the period in question. For example, assuming a disk rotating at 10,000 revolutions per minute is divided into 100 spokes, then the time between spokes is 60 microseconds. Thus, a delay of 20 spokes corresponds to a delay of 1.2 milliseconds.

As shown in FIG. 5, the start location 100 of the transducer 32 on track 29 of the disk 30 may be located at spoke 0. The target location of the addressed data block 102 on track 21 may be located at spoke 90. In a seek operation that corresponds to the use of a maximum current command, the servo controller 56 may move the transducer 32 along path 104 between the initial track 19 and the target track 21, reaching track 21 at spoke 35. Accordingly, the rotational latency associated with path 104 is 55 spokes.

For the path 110, however, the rotational latency may be less than one spoke, since the transducer 32 arrives at the target track 21a predetermined time/distance d before the addressed data block 102 (at spoke 90) reaches the transducer 32. The time/distance d required for the transducer 32 to settle on the target track 21 may in some embodiments be less than one spoke.

Figure 4:
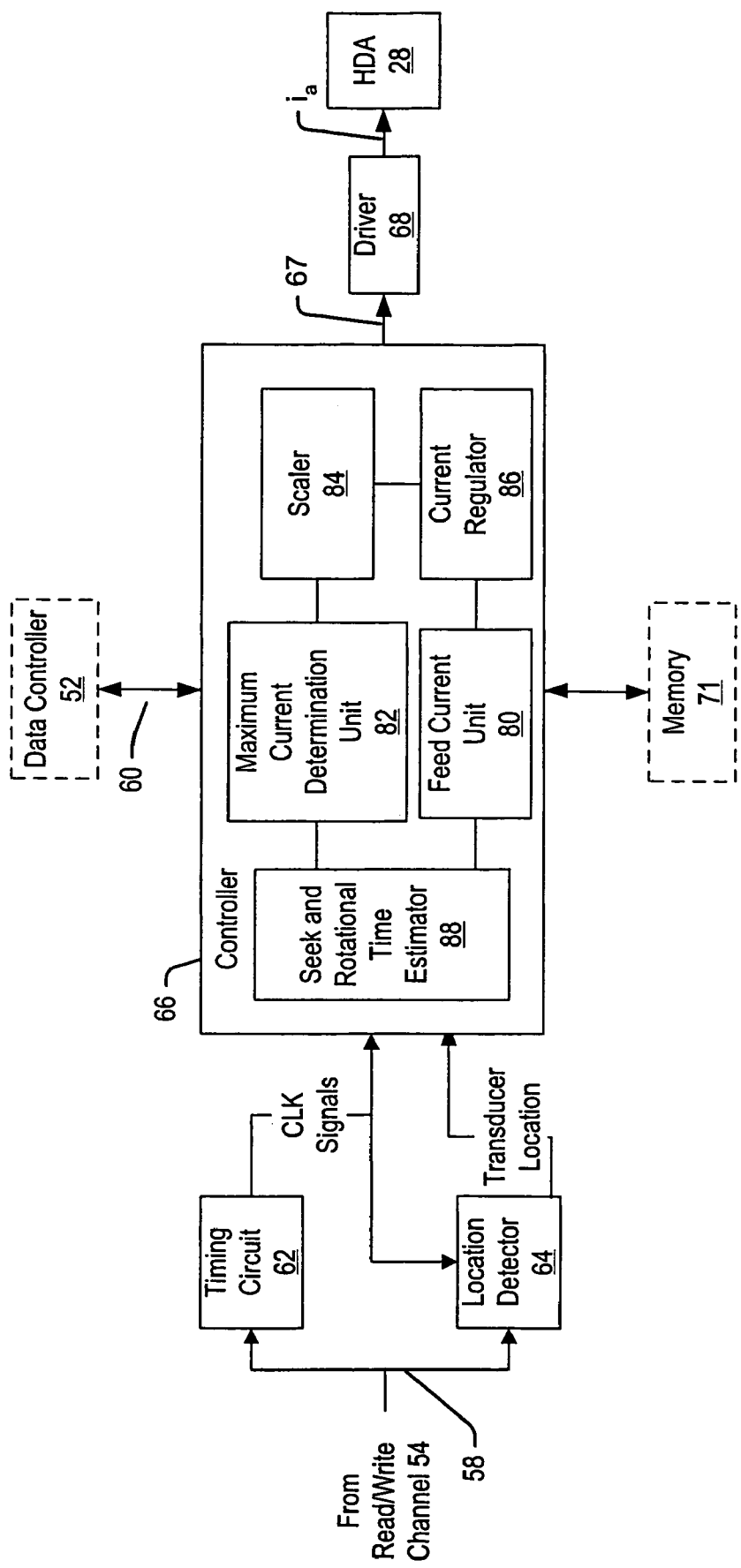
FIG. 4 is a block diagram of the servo controller according to some embodiments of the present invention.

These and other aspects of the servo controller 56 are described with reference now to FIG. 4 in accordance with some embodiments of the present invention. The servo controller 56 can include a timing circuit 62, a location detector 64, a controller 66, and a driver 68. The timing circuit 62 can generate clock signals synchronized with the passage of servo sectors 55 on tracks under the transducer 32. The timing circuit 62 can include a counter and a phase locked loop for generating the clock signals. Based on the clock signals from the timing circuit 62 and transducer location data provided by the read/write channel 54, the location detector 64 detects a location of the transducer 32 relative to tracks on the disk 30 and data blocks within the tracks 17. The detected transducer location information in each servo sector 55 provides the address of the track which contains the servo sector 55, and therefore, the location of the transducer 32 relative to that track. The timing circuit 56 is synchronized with the read/write channel 54, and the location detector 64 receives the transducer location data from the read/write channel 54.

The controller 66 controls movement and positioning of the transducer 32 during seek operations. In response to clock signals from the timing circuit 62, where each clock signal indicates passage of a servo sector 55 under the transducer 32. The controller 66 obtains the transducer location information from the location detector 64. The controller 66 can include a feed current unit 80, a maximum current determination unit 82, a scaler 84, a current regulator 86, and a seek and rotational time estimator 88.

The seek and rotational time estimator 88 determines an expected seek time and expected rotational latency time based on the location of the transducer 32 and the location of the addressed data block 102. The expected seek time may be determined based on the initial track 19 and the target track 21. For example, the expected seek time may be selected from among a table of a plurality of seek distances (e.g., number of tracks from the initial track 19 to the target track 21) and corresponding expected seek times. Such a table of seek distances and expected seek times may, for example, have common values that are used in multiple disk drives, rather than unique to each model of disk drive and/or a particular one of the disk drives. A seek distance 112 between the initial track 19 and the target track 21 is shown in FIG. 5. The expected rotational latency time may be determined based on an expected location of the transducer 32 after seeking to the target track 21 and based on the location of the addressed data block 102 (e.g., the expected rotation latency time corresponding to the angular amount 108).

The feed current unit 80 generates a feed current IFC based on the expected seek time (i.e., based on the seek distance). For example, the feed current IFC may be selected from among a table of a plurality of feed currents and corresponding expected seek times. In another example, the feed current IFC may be determined based on a feed current profile that provides a feed current IFC that varies based on distance from the target track.

The maximum current determination unit 82 is configured to determine a maximum current IMAX, which may be determined based on the initial track 19 and the target track 21 (i.e., the seek distance 112). For example, the maximum current IMAX may be selected from among a table of a plurality of maximum currents and corresponding expected seek times. The maximum current IMAX may correspond to a level of the input actuator current ia where the actuator 29 becomes saturated. The scaler 84 scales the maximum current IMAX to generate a scaled maximum current 90 based on the expected rotational latency time and the expected seek time. The current regulator 86 is configured to regulate the feed current IFC based on the scaled maximum current 90 to generate a regulated current command 67. For example, the current regulator 86 may limit the feed current IFC to no more than the scaled maximum current 90. Accordingly, the scaler 84 and current regulator 86 can slow down a seek operation so that the transducer 32 can settle on the target track 21a predetermined time before the addressed data block 102 reaches the transducer 32. In this manner, instead of the transducer 32 following the seek path 104 based on the feed command IFC, it may instead follow the seek path 110 based on the regulated current command 67.

Figure 6:
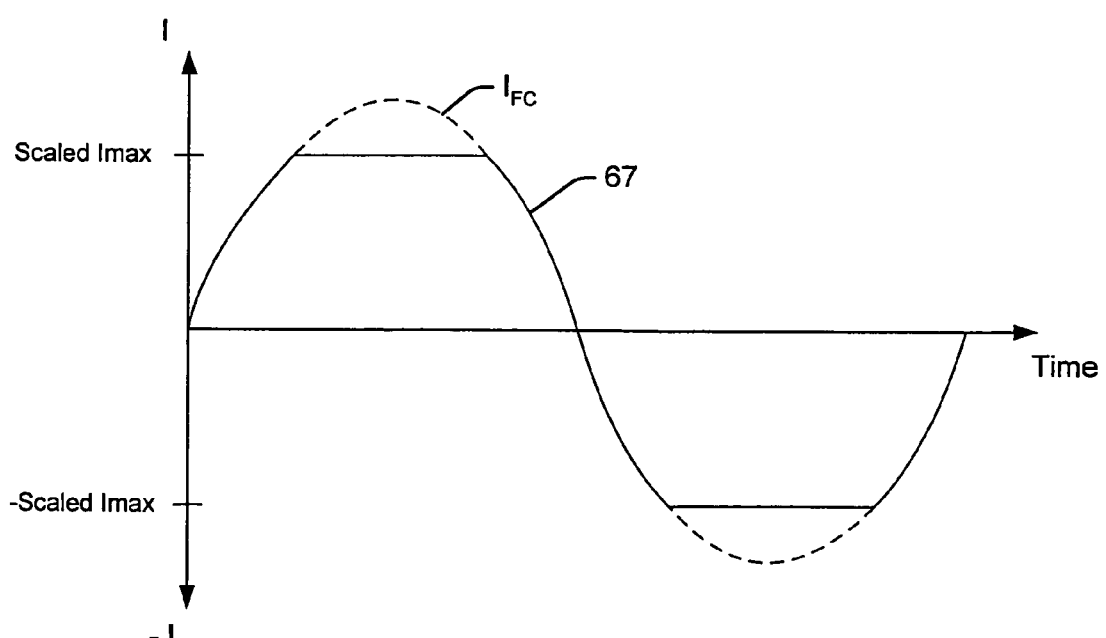
FIG. 6 is a graph of a seek operation current command that is regulated according to some embodiments of the present invention.

FIG. 6 is a graph showing an exemplary unregulated feed current IFC and regulated current command 67. The regulated current command 67 is constrained to be no more than the scaled maximum current 90. The portion of the unregulated feed current IFC that is constrained in the regulated current command 67 is represented by the dashed lines.

The scaler 84 may be configured to determine a scaling ratio based on a ratio of the expected rotational latency time to the expected seek time, and determine a scale factor based on the following equation:

$$\text{scale factor} = \frac{\text{tuning gain}}{\text{scaling ratio} + \text{tuning gain}}$$

The tuning gain is a predetermined number less than 1, such as, for example, 0.25. The scaler may then combine (e.g., multiply) the scale factor and the maximum current command to generate the scaled maximum current 90. For a given expected seek time, the scaling ratio may be small whenever the expected rotational latency time is small, which may occur for short or long seeks. When the scaling ratio is large, for example when the expected rotational latency time is substantially greater than the expected seek time, the scaling ratio may be large, which results in a relatively small scale factor.

For example, for a HDA 28 that has 10K RPM disks 30 with a random workload (i.e., no command reordering), the average rotational latency time will be about 3 milliseconds, corresponding to an average of one half of a revolution of the disks 30. The average seek operation may be assumed to ⅓ of the available stroke (i.e., between the innermost and outermost tracks), and correspond to a seek time of 4.0 milliseconds. The tuning gain is assumed to be 0.25. Accordingly, the average scale factor used to generate the scaled maximum current 90 from the maximum current IMAX is 0.25 (i.e., scale factor=0.25/(3.0/4.0+0.25)). The regulated current command 67 will therefore have a peak current that is reduced by 75%. In a variation of the exemplary embodiment, an input/output operation that has a rotational latency of a full revolution of the disks 30 will have a rotational latency time of about 6 milliseconds, and a corresponding scale factor of 0.14 (i.e., scale factor=0.25/(6.0/4.0+0.25)). The regulated current command 67 will therefore have a peak current that is reduced by 86%. The seek operation is thereby slowed down, which may reduce noise and vibration that may be caused in the HDA 29 components, and may improve the seek performance and/or off-track writing of data.

The regulated current command 67 generated by the controller 66 is provided to the driver 80. The driver 80 combines (e.g., multiplies) the regulated current command 67 and a gain value to generate the input actuator current ia, which is provided to the HDA 28 (i.e., actuator 29). When the input actuator current ia is applied to the motor 36 (FIG. 2), the transducer 32 can move radially inward or radially outward in a seek operation.

Figure 7:
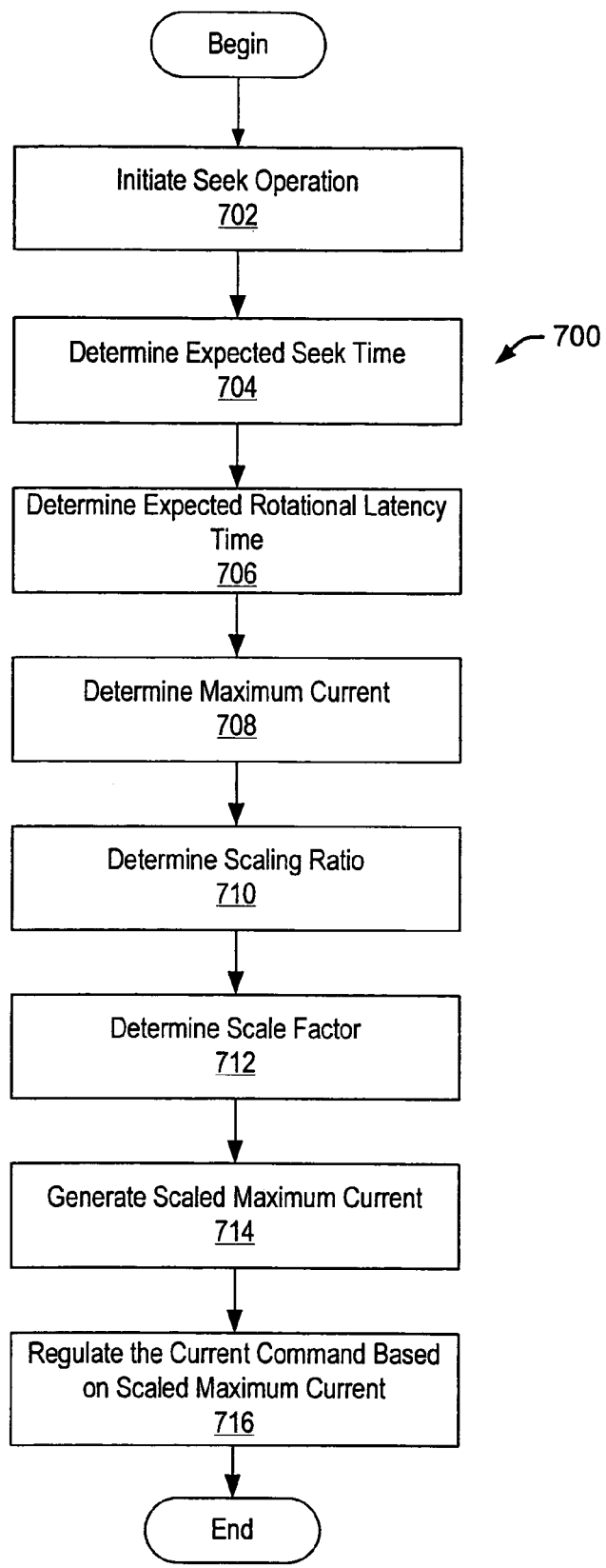
FIG. 7 is a flowchart showing operations for controlling seeking of a transducer by a current command that is regulated based on a transducer location and an addressed data block according to some embodiments of the invention.

FIG. 7 is a flowchart of operations of a process 700 for controlling seeking of a transducer by a current command that is regulated according to some embodiments of the present invention. The process 700 may be performed by the servo controller 56 shown in FIG. 3. At Block 702, a seek operation that seeks the transducer from an initial track to a target track is initiated. At Block 704, an expected seek time is determined by, for example, selecting the seek time from among a plurality of seek times based on the seek distance between the initial and final tracks. At Block 706, an expected rotational latency time is determined based on, for example, an expected location of the transducer after seeking to the target track and based on the location of an addressed data block. At Block 708, a maximum current is determined by, for example, selecting the maximum current from among a plurality of maximum currents based on the expected seek time. At Block 710, a scaling ratio is determined based on a ratio of the expected rotational latency time to the expected seek time. At Block 712, a scale factor is determined based on, for example, a ratio of the tuning gain divided by the sum of the scaling ratio and the tuning gain. At Block 714, a scaled maximum current is generated based on the determined maximum current and the scaling ratio. At Block 716, the current command that is used to seek the transducer is regulated based on the scaled maximum current.

In other embodiments, instead of calculating a scale factor and scaling a current command by a scale factor, a disk drive 25 may include a lookup table or plurality of lookup tables containing an entry for each possible track/spoke offset containing a current command selected to provide a path of the transducer 32 that has a reduced rotational latency, for example a rotational latency of no more than the predetermined time/distance d required for the transducer 32 to settle on the target track.

As discussed above, conventional disk drives include circuitry configured to shut down the disk drive if a temperature associated with the disk drive 25 exceeds a predetermined maximum operating temperature Tmax. When the temperature of the disk drive 25 exceeds the maximum operating temperature, the result may be an abrupt shutdown of the disk drive 25, which may result in loss and/or corruption of data. While a shutdown is not ideal, it may be preferable to continuing to operate the disk drive 25 under conditions that could potentially harm the disk drive 25. However, it is preferable to avoid a thermal shutdown if possible.

The current flowing through the actuator coil 40 may contribute to heating of the disk drive 25. In order to potentially avoid a thermal shutdown condition, embodiments of the invention control the input actuator current ia to limit the amount of current flowing through the actuator coil 40 during seeking operations. In particular, in some embodiments of the invention, before a seek operation, a temperature associated with the disk drive 25 is sensed. If the sensed temperature exceeds a threshold level, a lower actuator current may be supplied to the actuator coil so that the seek operation may be slowed.

In some embodiments, slowing of the seek operation may be performed in order to ensure that a seek time of a particular seek operation is at least as long as a minimum seek time. For example, the seek operation may be slowed to ensure that the seek takes at least a minimum number of spokes. In other embodiments, a seek operation may be delayed by a predetermined seek delay (e.g., by a predetermined number of spokes). The predetermined seek delay may correspond to an integer number of disk revolutions and/or a fractional number of disk revolutions.

The minimum seek time and/or seek delay may be increased as the temperature associated with the disk drive 25 increases. For example, a plurality of increasing minimum seek times and/or seek delays may be defined based on a corresponding plurality of increasing temperature thresholds. Thus, as the temperature associated with the disk drive 25 increases, embodiments of the present invention may respond with more aggressive reductions of the actuator current in an effort to control the temperature associated with the disk drive 25.

In some embodiments, the seek delay may be implemented by increasing a rotational latency time used in calculating a current command as provided above. Increasing the rotational latency time decreases the scale factor used in scaling the current command, which may result in a lower peak actuator current. In some embodiments, the rotational latency may be increased by an integer and/or fractional number of disk revolutions.

Slowing the seek times of a number of queued I/O requests by an integer number of disk revolutions may be desirable in some cases, because doing so will not change the order at which buffered I/O request should be carried out. Thus, additional processing to reorder buffered I/O requests may not be necessary.

For example, suppose the data controller 52 of a disk drive 25 has two I/O requests, I/O Request A and I/O Request B, in an I/O queue, and that the transducer 32 of the disk drive 25 is currently located at spoke 0 of a disk 30 that has 100 spokes. Suppose further that the target spoke for I/O Request A is located at spoke 50, the target spoke for I/O Request B is located at spoke 60, and that the transducer 32 is initially located on an initial track such that the seek time required to move the transducer to the target track for either I/O request is 40 spokes. Absent other factors (such as delays due to excess temperature), an ordering algorithm would execute I/O Request A first, since it has the shorter access time.

If the seek times of both the first and second I/O requests are increased by 100 spokes (i.e. one full disk revolution) in response to an increased temperature condition, then the seek time for I/O Request A becomes 150 spokes, while the seek time for I/O Request B becomes 160 spokes. Again, the ordering algorithm would execute I/O Request A first, since it still has the shorter access time.

In some embodiments, however, the seek times of both of the I/O requests may be increased by a seek delay in response to an excess temperature condition (i.e. if the temperature associated with the disk drive is determined to be above a threshold temperature). For example, each seek time may be increased by 15 spokes, in which case, continuing the example above, the seek time for either I/O request would be 55 spokes. In that case, the ordering algorithm would execute I/O Request B first, since the delayed seek time of 55 spokes would still be sufficient to move the transducer to the target track in time to read the target data located at spoke 60. The seek time for I/O Request A may then be re-calculated based on a new starting location for the transducer 32 after it has finished executing I/O Request B.

The amount by which the seek times are increased may depend on the temperature associated with the disk drive 25, and a plurality of seek delays may be associated with a corresponding plurality of threshold temperatures. For example, a base threshold value T0 may be defined at which temperature compensation according to embodiments of the invention may begin. Thus, when the temperature associated with the disk drive 25 is below the base threshold value, no temperature compensation may be performed. As shown in Table 1, a plurality of thresholds T1, T2, etc., may be defined relative to the base temperature threshold T0. When the temperature associated with the disk drive 25 exceeds one of the plurality of thresholds, subsequent seek operations may be delayed by a corresponding seek delay.

TABLE 1

| Threshold | Seek Delay (in spokes) |
|---|---|
| T0 (e.g. = 60° C.) | 10 |
| T1 = T0 + 1° C. | 20 |
| T2 = T0 + 2° C. | 50 |
| T3 = T0 + 3° C. | 100 |
| T4 = T0 + 4° C. | 200 |

Alternatively, as shown in Table 2, when the temperature associated with the disk drive 25 exceeds one of the plurality of thresholds, subsequent seek operations may be delayed such that they have a seek time that is at least equal to a corresponding minimum seek time.

TABLE 2

| Threshold | Min. Seek Time (spokes) |
|---|---|
| T0 (e.g. = 60° C.) | 40 |
| T1 = T0 + 1° C. | 50 |
| T2 = T0 + 2° C. | 100 |
| T3 = T0 + 3° C. | 200 |
| T4 = T0 + 4° C. | 400 |

In either case, in some embodiments of the invention, a hysteresis may be provided such that after the temperature has exceeded a particular threshold, resulting in the establishment of a minimum seek time and/or seek delay corresponding to the threshold, a lower delay and/or minimum seek time may not be used until the temperature associated with the disk drive 25 has fallen below a temperature below the particular threshold by a predetermined temperature difference. For example, assuming that the disk drive 25 is configured to provide a seek delay based on a temperature associated with the disk drive 25 as provided in Table 1, and assuming that the temperature associated with the disk drive 25 rises to a temperature above threshold T1 but less than threshold T2, then in that case, subsequent seek operations would be delayed by a seek delay of 20 spokes. If the temperature then falls lower than T1, the seek delay would not step down to 10 spokes until the temperature falls below T0.

In some embodiments, however, no hysteresis may be provided, and the seek delay and/or minimum seek time may be determined simply by comparing the sensed temperature to the threshold values.

As discussed above, in some embodiments, the actuator current may be reduced by increasing the rotational latency time used in calculating a current command. As explained above, the total access time calculated for a particular disk access is equal to the sum of the expected seek time (i.e. the expected time required to move from an initial track to a target track assuming current saturation) and the rotational latency after the target track is reached. According to the methods described above, a current command may be scaled by a scaling factor that is based on the expected seek time and the rotational latency, as follows:

$$\text{scaling ratio} = \frac{\text{rotational latency}}{\text{expected seek time}}$$

$$\text{scale factor} = \frac{\text{tuning gain}}{\text{scaling ratio} + \text{tuning gain}}$$

Thus, increasing the rotational latency time decreases the scale factor used in scaling the current command, which may result in a lower peak actuator current. In some embodiments, before calculating the scaling ratio, the rotational latency value may be increased by a quantity that is a function of the difference between the sensed temperature and a temperature threshold. For example, the rotational latency value, expressed in spokes, may be increased by a quantity LATE_INC, as follows:

LATE_INC=GAIN*deltaT*SPOKES_PER_REV

GAIN is a gain value that may be set to match a desired level of protection, and deltaT is the difference between the current temperature associated with the disk drive 25 (i.e. the sensed temperature) and a threshold temperature. In some cases, the value of GAIN may be different at different thresholds. For example, the value of GAIN may increase as the sensed temperature increases. Since the latency increase LATE_INC is already a function of deltaT, this may result in the rotational latency being a nonlinear function of temperature. SPOKES_PER_REV is a constant that defines the number of spokes in a single revolution of the disk 30. Thus, if the value of GAIN is set at 1, the rotational latency will increase by one rotation of the disk 30 for each degree the sensed temperature exceeds the threshold temperature. Other values of GAIN may be used depending on the level of protection desired.

Figure 8:
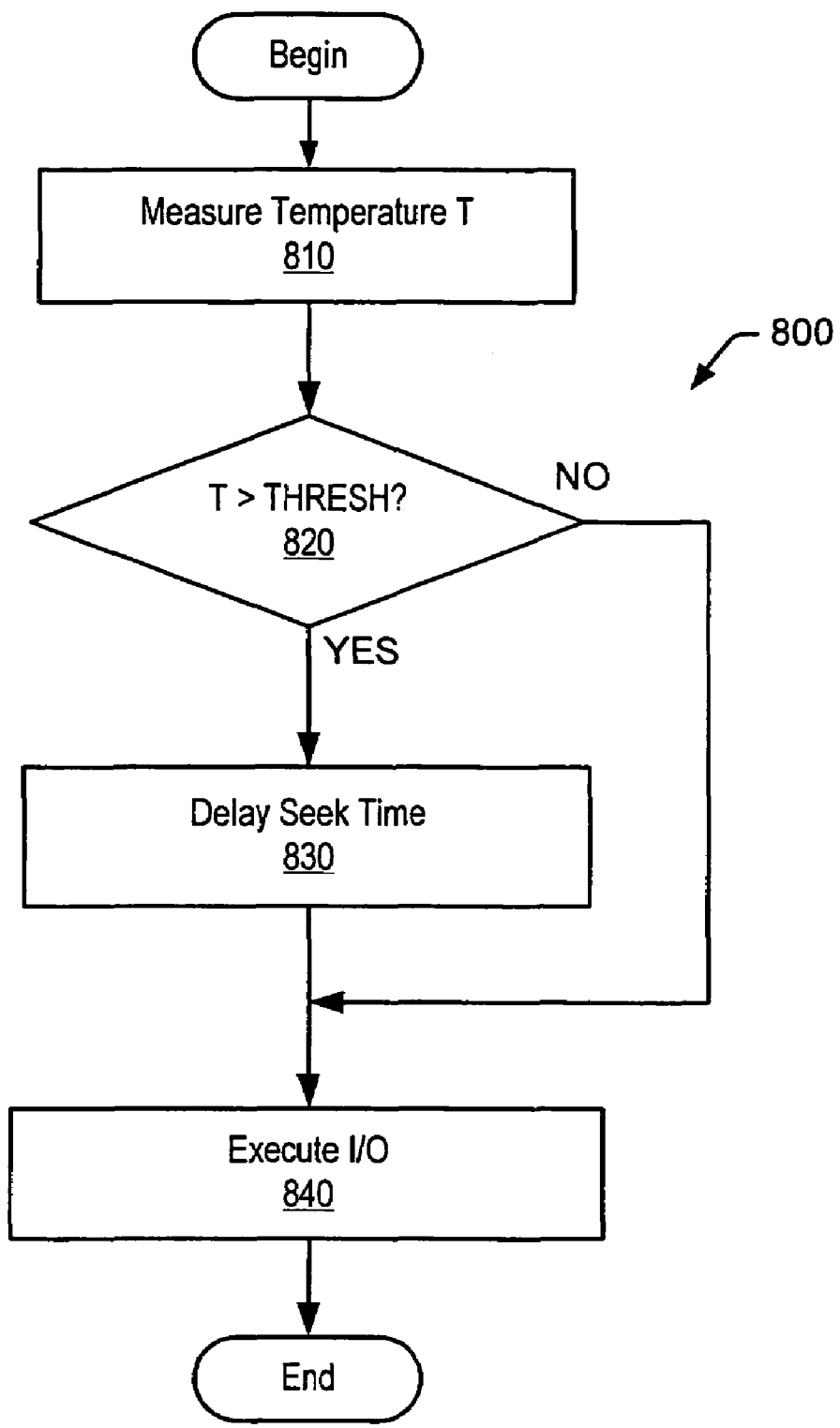
FIG. 8 is a flowchart showing operations for increasing a seek time responsive to an increased temperature according to some embodiments of the invention.

FIG. 8 is a flowchart showing operations 800 for increasing a seek time responsive to an increased temperature according to some embodiments of the invention. The operations 800 may be performed prior to each I/O request received by a disk drive 25. Alternatively or additionally, the operations 800 may be repetitively performed, such as periodically every n seconds, and the seek delay established therein, if any, may be used for all seek operations until the operations 800 are performed again.

As shown in FIG. 8, a temperature T associated with the disk drive 25 is measured, for example using an on-drive PCBA temperature sensor (block 810). The sensed temperature T is compared with a threshold temperature THRESH (block 820). If the sensed temperature is greater than the threshold temperature THRESH, then the seek time of the current I/O request is delayed (block 830) and the I/O request is executed (block 840). Otherwise, i.e. if the sensed temperature T is not greater than the threshold temperature, the I/O request is executed without being delayed. The seek time may be delayed by a fixed seek time and/or a seek delay based on the sensed temperature T and/or a difference between the sensed temperature T and the threshold temperature THRESH. Alternatively or additionally, the seek time may be delayed by increasing a rotational latency value associated with the I/O request. The rotational latency may be increased by a value based on the product of a gain value and a temperature difference between the sensed temperature T and the threshold temperature THRESH, as provided above.

As discussed above in connection with Table 1, multiple thresholds may be provided, each having a corresponding seek delay associated therewith. The seek delay may be chosen and/or calculated based on the highest threshold that the sensed temperature T exceeds.

Figure 9:
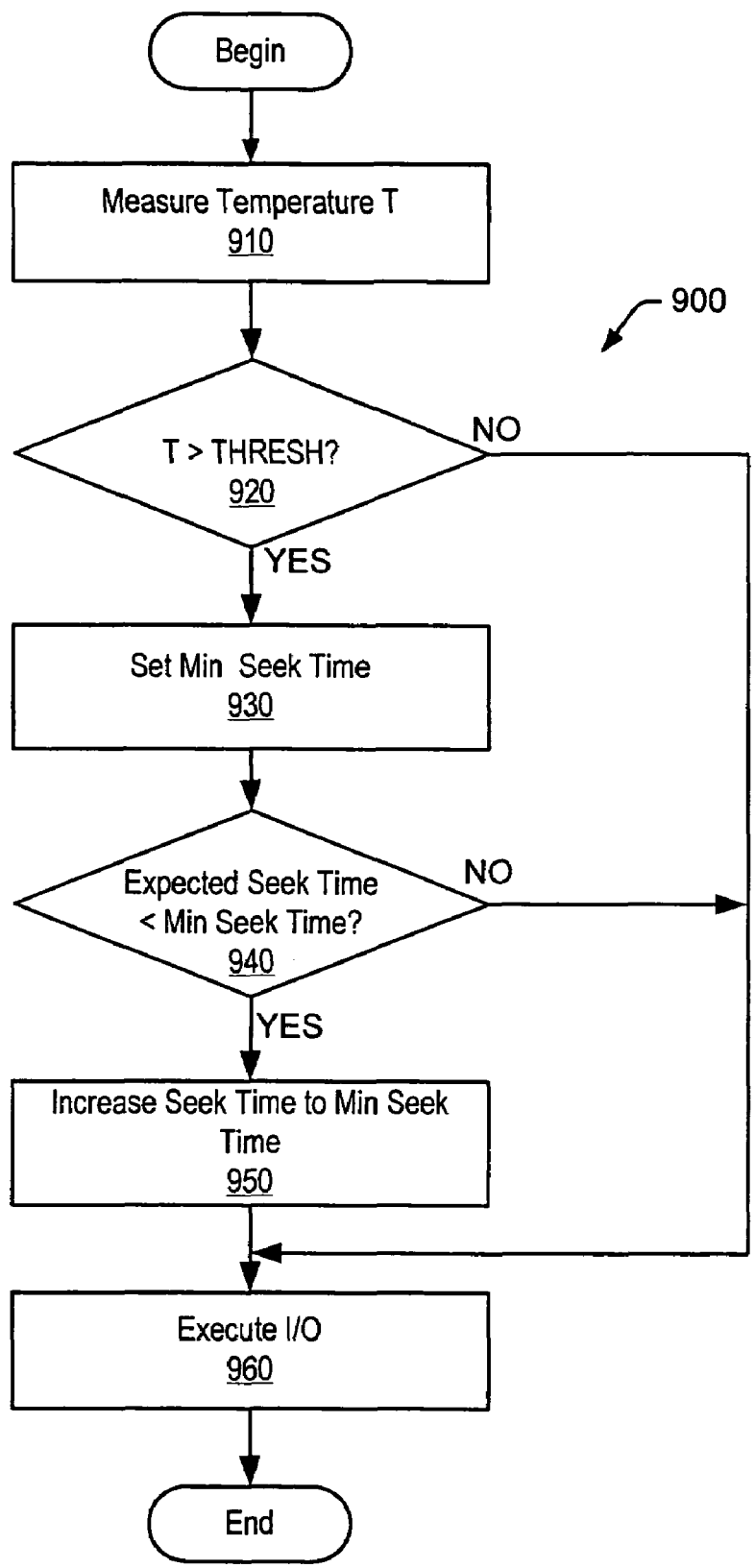
FIG. 9 is a flowchart showing operations for increasing a minimum seek time responsive to an increased temperature according to some embodiments of the invention.

FIG. 9 is a flowchart showing operations 900 for increasing a minimum seek time responsive to an increased temperature according to some embodiments of the invention. The operations 900 may be performed prior to each I/O request received by a disk drive 25. Alternatively or additionally, the operations 900 may be performed periodically, such as every n seconds, and the minimum seek time established therein, if any, may be used for all seek operations until the operations 900 are performed again.

As shown in FIG. 9, when an I/O request is received, a temperature T associated with the disk drive 25 is measured, for example using an on-drive PCBA temperature sensor (block 910). The sensed temperature T is compared with a threshold temperature THRESH (block 920). If the sensed temperature T is greater than the threshold temperature THRESH, then a minimum seek time is established (block 930). The expected seek time of the current I/O request is then compared to the minimum seek time selected based on the sensed temperature T (block 940). If the expected seek time is shorter than the minimum seek time, the seek time of the I/O request is increased to at least the minimum seek time (block 950), and the I/O request is executed (block 960).

As discussed above in connection with Table 2, multiple thresholds may be provided, each having a corresponding minimum seek time associated therewith.

Figure 10:
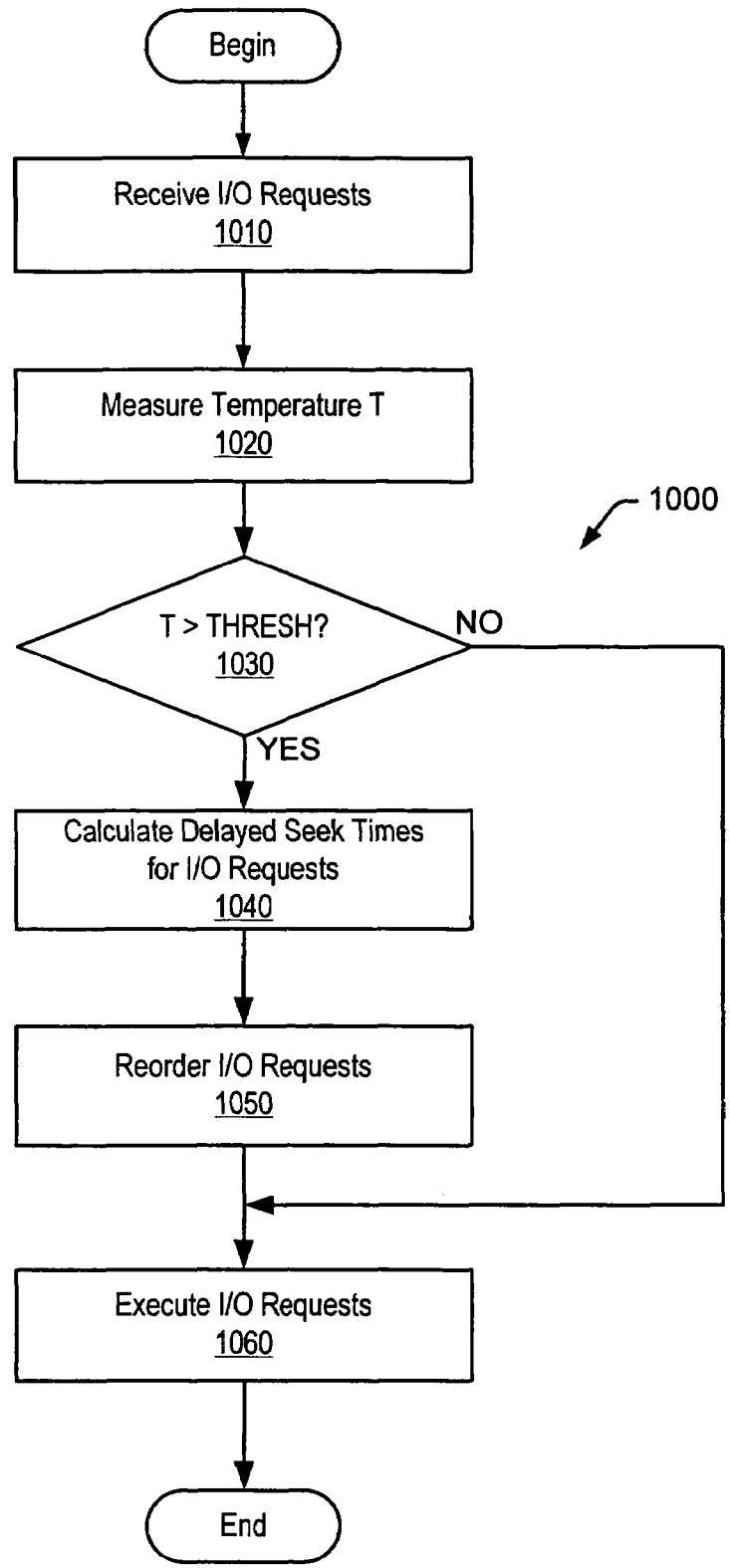
FIG. 10 is a flowchart showing operations associated with changing a seek delay and/or minimum delay time for a plurality of queued I/O requests in a disk drive according to some embodiments of the invention.

FIG. 10 is a flowchart showing operations 1000 associated with changing a seek delay and/or minimum delay time for a plurality of queued I/O requests in a disk drive 25. As shown therein, a plurality of I/O requests are received and queued in a data controller 52 of a disk drive 25 (block 1010). For example, a plurality of I/O requests may be received while an earlier I/O request is being executed. A temperature T associated with the disk drive is measured (block 1020), and the measured temperature T is compared to a threshold temperature THRESH (block 1030). If the measured temperature T is not greater than the threshold temperature, the I/O requests are executed (block 1060). Otherwise, if the measured temperature is greater than the threshold temperature, delayed seek times are calculated for the I/O requests (block 1040). Each seek time may be delayed as provided above by a predetermined value and/or based on an increased rotational latency time. Alternatively or additionally, the seek times may be compared to a minimum seek time and increased as necessary to exceed the minimum seek time. The I/O requests may then be reordered by the data controller 52 to provide an improved data throughput (block 1050), and the reordered I/O requests are executed (block 1060).

Figure 11:
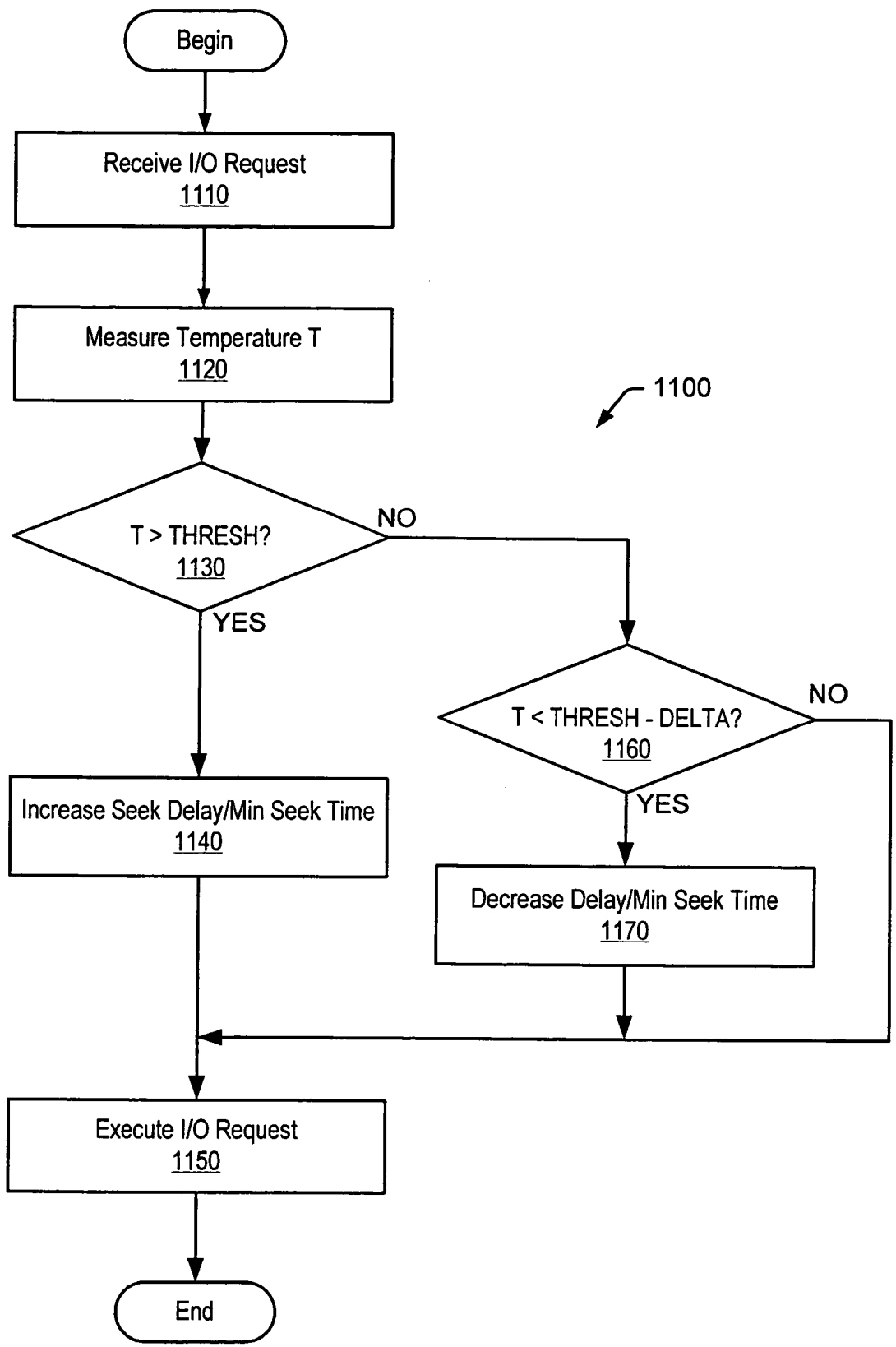
FIG. 11 is a flowchart showing operations associated with changing a seek delay and/or minimum delay time in a disk drive according to some embodiments of the invention.

FIG. 11 is a flowchart showing operations 1100 for increasing a minimum seek time and/or seek delay responsive to an increased temperature according to some embodiments of the invention. Operations 1100 include a hysteresis which may provide more conservative temperature control in a disk drive 25. As illustrated therein, after an I/O request is received (block 1110), the temperature of the disk drive 25 is measured (block 1120) and the measured temperature T is compared to a threshold THRESH (block 1130). If the temperature T is greater than the threshold, a seek delay and/or minimum seek time is increased (block 1140), and the I/O request is executed (block 1150). If the temperature T is less than the threshold THRESH, a second check is performed to see if the measured temperature is less than the threshold THRESH by more than a predetermined amount DELTA (block 1160). If not, then the I/O request is executed with the current seek delay/minimum threshold time. However, if the measured temperature is less than the temperature threshold THRESH by more than the predetermined amount DELTA, then the seek delay/minimum seek time is reduced. The seek delay/minimum seek time may be reduced by a predetermined amount and/or by an amount that is proportional and/or dependent on the measured temperature T. The predetermined amount DELTA may correspond to a difference between sequential temperature thresholds, for example as described in reference to Table 1 and/or Table 2.

Accordingly, embodiments of the present invention may provide flexible, adaptive temperature control for a disk drive 25 by adaptively adjusting a seek time of an I/O command to thereby reduce heating in the disk drive 25 due to actuator currents.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling seeking of a transducer that is adjacent to a rotatable disk in a disk drive, the method comprising:
    detecting a temperature associated with the disk drive;
    determining a seek time associated with moving the transducer from an initial track on the rotatable disk to a target track on the rotatable disk, wherein the seek time is varied in response to the detected temperature;
    generating a current command based on the seek time; and
    seeking the transducer from the initial track to the target track on the disk based on the current command.

2. The method of claim 1, wherein generating the current command comprises selecting the current command independent of temperature and scaling the current command based on the detected temperature.

3. The method of claim 1, further comprising:
    determining if the detected temperature exceeds a temperature threshold; and
    responsive to the detected temperature exceeding the temperature threshold, increasing the seek time to provide an increased seek time.

4. The method of claim 3, wherein increasing the seek time comprises increasing the seek time by a seek delay, wherein the seek delay is a constant value.

5. The method of claim 3 wherein increasing the seek time comprises increasing the seek time by a seek delay, wherein the seek delay is based on an amount by which the detected temperature exceeds the temperature threshold.

6. The method of claim 5, further comprising:
    determining if the detected temperature is below the threshold by a predetermined amount; and
    responsive to the detected temperature being below the threshold by a predetermined amount, decreasing the seek delay.

7. The method of claim 3, wherein increasing the seek time comprises increasing the seek time to at least a minimum seek time.

8. The method of claim 7, further comprising:
    determining if the detected temperature is below the threshold by a predetermined amount; and
    responsive to the detected temperature being below the threshold by a predetermined amount, decreasing the minimum seek time.

9. The method of claim 1, further comprising:
    receiving a plurality of I/O requests including a first I/O request and a second I/O request, wherein determining a seek time associated with moving the transducer from an initial track on the rotatable disk to a target track on the rotatable disk comprises determining a seek time for the first I/O request;
    queuing the first I/O request and the second I/O request;
    determining a seek time for the second I/O request;
    increasing the seek time of the second I/O request;
    determining a rotational latency time for the first I/O request based on the increased seek time of the first I/O request;
    determining a rotational latency time for the second I/O request based on the increased seek time of the second I/O request; and
    executing the first I/O request before the second I/O request in response to the sum of the delayed seek time and the expected rotational latency of the second I/O request exceeding the sum of the delayed seek time and the expected rotational latency of the first I/O request.

10. The method of claim 1, wherein:
    determining a seek time comprises determining an expected seek time associated with moving the transducer from the initial track on the rotatable disk to the target track on the rotatable disk and an expected rotational latency time associated with rotating the rotatable disk to a target sector on the target track;
    increasing the seek time comprises increasing the expected rotational latency time to provide an increased rotational latency time; and
    generating a current command comprises selecting a current command based on the seek time and scaling the current command based on the increased rotational latency time.

11. The method of claim 10, wherein increasing the expected rotational latency time comprises increasing the expected rotational latency time by a time equal to an integer number of rotational periods of the rotatable disk.

12. The method of claim 10, wherein increasing the expected rotational latency time comprises increasing the expected rotational latency time by a time equal to a fractional number of rotational periods of the rotatable disk.

13. The method of claim 10, further comprising:
    determining if a sum of the expected seek time and the expected rotational latency time exceeds a minimum seek time;
    responsive to the sum of the expected seek time and the expected rotational latency time exceeding a minimum seek time, scaling the current command based on the expected seek time and the expected rotational latency time to generate the scaled current command; and
    seeking the transducer from the initial track to the target track on the disk based on the scaled current command.

14. The method of claim 13, further comprising reordering an I/O request queue to permit an I/O request for which a sum of an expected seek time and an expected rotational latency time exceeds the minimum seek time to be executed ahead of an I/O request for which a sum of an expected seek time and an expected rotational latency time does not exceed the minimum seek time.

15. The method of claim 10, wherein determining an expected seek time and an expected rotational latency time comprises:
    determining the expected seek time based on the initial track and the target track; and
    determining the expected rotational latency time based on an expected location of the transducer after seeking to the target track and based on the location of the addressed data block.

16. The method of claim 10, further comprising:
    determining a maximum current based on the initial track and the target track,
    wherein scaling the current command comprises scaling the maximum current to generate a scaled maximum current based on the increased expected rotational latency time and the expected seek time, and constraining the current command to no more than the scaled maximum current.

17. The method of claim 16, wherein determining a maximum current comprises selecting the maximum current from among a plurality of maximum currents that have been predefined based on the initial track and the target track.

18. The method of claim 16, wherein scaling the maximum current comprises:
   determining a scaling ratio based a ratio of the expected rotational latency time to the expected seek time;
   determining a scale factor based on the following equation, $$\text{scale factor} = \frac{\text{tuning gain}}{\text{scaling ratio} + \text{tuning gain}}$$

wherein tuning gain is a predetermined number less than 1; and
   combining the scale factor and the maximum current command to generate the scaled maximum current.

19. A method of controlling seeking of a transducer that is adjacent to a rotatable disk in a disk drive, the method comprising:
   detecting a temperature associated with the disk drive;
   determining if the detected temperature exceeds a temperature threshold; and
   responsive to the detected temperature exceeding the temperature threshold, increasing a minimum seek time and/or a seek delay associated with moving the transducer from an initial track on the rotatable disk to a target track on the rotatable disk.

20. The method of claim 19, wherein the temperature threshold comprises an upper temperature threshold, the method further comprising:
   determining if the detected temperature is below a lower temperature threshold that is lower than the upper temperature threshold; and
   responsive to the detected temperature being lower than the lower temperature threshold, decreasing the minimum seek time and/or the seek delay.

21. The method of claim 19, further comprising:
   determining a seek time for an I/O request;
   increasing the seek time of the I/O request to provide an increased seek time when the seek time of the I/O request exceeds the minimum seek time;
   calculating a current command based on the increased seek time; and
   seeking the transducer from the initial track to the target track on the disk based on the current command.

22. The method of claim 21, wherein increasing the seek time comprises increasing the seek time by a time equal to one rotational period of the rotatable disk.

23. The method of claim 21, wherein the I/O request comprises a first I/O request that is queued ahead of a second I/O request, the method further comprising:
   determining an expected seek time for the second I/O request; and
   executing the second I/O request before the first I/O request in response to the expected seek time for the second I/O request exceeding the minimum seek time.

24. The method of claim 19, further comprising:
   determining a seek time for a first queued I/O request;
   determining a seek time for a second queued I/O request;
   increasing the seek times of the first and second queued I/O requests by the seek delay to provide increased seek times for the first and second queued I/O requests;
   determining a rotational latency time for the first I/O request based on the increased seek time of the first I/O request;
   determining a rotational latency time for the second I/O request based on the increased seek time of the second I/O request; and
   executing the first I/O request before the second I/O request in response to the sum of the delayed seek time and the expected rotational latency of the second I/O request exceeding the sum of the delayed seek time and the expected rotational latency for the first I/O request.

25. A method of controlling seeking of a transducer that is adjacent to a rotatable disk in a disk drive, the method comprising:
   determining an expected seek time associated with moving the transducer from an initial track on the rotatable disk to a target track on the rotatable disk and an expected rotational latency time associated with rotating the rotatable disk to a target sector on the target track;
   detecting a temperature associated with the disk drive;
   determining if the detected temperature exceeds a temperature threshold;
   responsive to the detected temperature exceeding the temperature threshold, increasing the expected rotational latency time to provide an increased rotational latency time;
   selecting a current command based on the expected seek time;
   scaling the current command based on the expected seek time and the increased rotational latency time; and
   seeking the transducer from the initial track to the target track on the rotatable disk based on the scaled current command.

26. An apparatus for controlling seeking of a transducer that is adjacent to a rotatable disk in a disk drive, the apparatus comprising:
   a servo controller configured to detect a temperature associated with the disk drive and to determine a seek time associated with moving the transducer from an initial track on the rotatable disk to a target track on the rotatable disk based on the detected temperature,
   wherein the servo controller is further configured to generate a current command based on the seek time, and to seek the transducer from the initial track to the target track on the disk based on the current command.

27. The apparatus of claim 26, wherein the servo controller is further configured to determine if the detected temperature exceeds a temperature threshold and to increase the seek time to provide an increased seek time in response to the detected temperature exceeding the temperature threshold.

28. The apparatus of claim 26, wherein the servo controller is further configured to generate the current command by selecting the current command based on the seek time and scaling the current command based on the increased seek time.

29. The apparatus of claim 28, wherein the servo controller is further configured to increase the seek time by a seek delay and the seek delay is based on an amount by which the detected temperature exceeds the temperature threshold.

30. The apparatus of claim 28, wherein the servo controller is further configured to increase the seek time by a seek delay and the seek delay is a constant value.

31. The apparatus of claim 26, wherein the servo controller is further configured to determine if the detected temperature is below the threshold by a predetermined amount; and responsive to the detected temperature being below the threshold by a predetermined amount, to decrease the seek delay.

32. The apparatus of claim 26, wherein the servo controller is further configured to increase the seek time to at least a minimum seek time.

33. The apparatus of claim 32, wherein the servo controller is further configured to determine if the detected temperature is below the threshold by a predetermined amount; and responsive to the detected temperature being below the threshold by a predetermined amount, to decrease the minimum seek time.

34. The apparatus of claim 26, wherein the servo controller is further configured to receive a plurality of I/O requests including a first I/O request and a second I/O request, to queue the first I/O request and the second I/O request, to determine seek times for the first and second I/O requests, and to increase the seek times of the first and second I/O requests in response to the detected temperature;

the servo controller is further configured to determine a rotational latency time for the first I/O request based on the increased seek time of the first I/O request and a rotational latency time for the second I/O request based on the increased seek time of the second I/O request; and the servo controller is further configured to execute the first I/O request before the second I/O request responsive to the sum of the delayed seek time and the expected rotational latency of the second I/O request exceeding the sum of the delayed seek time and the expected rotational latency of the first I/O request.

* * * * *

UNITED STATES PATENT AND TRADEMARK OFFICE
CERTIFICATE OF CORRECTION

PATENT NO. : 7,324,296 B1
APPLICATION NO. : 11/384655
DATED : January 29, 2008
INVENTOR(S) : DeRosa Page 1 of 1

It is certified that error appears in the above-identified patent and that said Letters Patent is hereby corrected as shown below:

Column 17, Claim 9, Line 67: Please correct "queuing"
To read -- queueing --

Signed and Sealed this

Tenth Day of June, 2008

JON W. DUDAS
*Director of the United States Patent and Trademark Office*